(12) United States Patent
Flanigan et al.

(10) Patent No.: US 11,542,676 B2
(45) Date of Patent: *Jan. 3, 2023

(54) SYSTEMS, METHODS, AND MACHINES FOR AUTONOMOUSLY DRIVING FOUNDATION COMPONENTS

(71) Applicant: Ojjo, Inc., San Rafael, CA (US)

(72) Inventors: Daniel Flanigan, Petaluma, CA (US); Steven Kraft, Albany, CA (US); Charles Almy, Berkeley, CA (US); Spencer Shupe, Antioch, CA (US); Tyrus Hudson, Petaluma, CA (US); Ryan Woodward, Fairfax, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,509

(22) Filed: Dec. 28, 2020

(65) Prior Publication Data

US 2021/0198860 A1 Jul. 1, 2021

Related U.S. Application Data

(63) Continuation of application No. 16/659,440, filed on Oct. 21, 2019, now Pat. No. 10,907,318.

(60) Provisional application No. 62/756,028, filed on Nov. 5, 2018, provisional application No. 62/748,083, filed on Oct. 19, 2018.

(51) Int. Cl.
*E02D 7/22* (2006.01)
*E02D 13/00* (2006.01)
*E02D 7/24* (2006.01)

(52) U.S. Cl.
CPC ............... *E02D 7/22* (2013.01); *E02D 7/24* (2013.01); *E02D 13/00* (2013.01); *E02D 2600/10* (2013.01)

(58) Field of Classification Search
CPC ....... E02D 7/22; E02D 13/00; E02D 2600/10; E02D 7/24; E02D 7/26; E02D 5/56; E02D 5/801; E21B 44/00
See application file for complete search history.

(56) References Cited

U.S. PATENT DOCUMENTS

2016/0047220 A1* 2/2016 Sharp .................... G06F 30/20
700/275

FOREIGN PATENT DOCUMENTS

WO WO-2012074381 A2 * 6/2012 ............... E02D 7/18

* cited by examiner

*Primary Examiner* — Carib A Oquendo
(74) *Attorney, Agent, or Firm* — Phillip D. Mancini (57) ABSTRACT

A closed-loop feedback-control system for a screw anchor driving machine that uses a controller such as a programmable logic controller (PLC) and an array of sensors providing real-time data to control an automated screw anchor driving operation relying on a rotary driver, a crowd motor applying downforce to the rotary driver and a tool driver extending a tool through the rotary driver and screw anchor to drive screw anchors to a target depth. The tool driver is independently controllable to advance the tool at a different feed and speed than the rotary driver to respond to underground conditions encountered during driving.

12 Claims, 10 Drawing Sheets

SYSTEMS, METHODS, AND MACHINES FOR AUTONOMOUSLY DRIVING FOUNDATION COMPONENTS

CROSS-REFERENCE TO RELATED APPLICATIONS

This is a continuation of U.S. patent application Ser. No. 16/659,440 filed on Oct. 21, 2019, now issued as U.S. patent Ser. No. 17/135,509, which claims priority to U.S. provisional patent application Nos. 62/748,038, titled "Foundations for axial solar arrays and related systems and methods," filed on Oct. 19, 2018; and 62/756,028, titled "Closed loop feedback control for improved solar pile driving and related systems, methods, machines, and circuits," filed on Nov. 5, 2018, the disclosures of which are hereby incorporated by reference in their entirety.

BACKGROUND

As the price of solar has dropped relative to fossil fuel-based energy sources, single-axis solar trackers are becoming the preferred form factor for so-called utility-scale solar arrays. Utility-scale arrays may span a few megawatts of capacity up to hundreds of kilowatts. Single-axis trackers are configured as North-South oriented single or double rows of solar panels attached to a torque tube. The torque tube is attached to a motor or other drive mechanism that slowly rotates all the attached panels at once, so they move from East-facing to West-facing to follow the sun's daily movement through the sky.

Tracker companies usually supply all the components that attach to the torque tube (e.g., bearings, motors or drive assemblies, dampers and module brackets), but rely on other companies to supply the foundation that anchors their systems to the Earth using a standard interface. The predominate foundation is a standard is the W6×9 or W6×12 galvanized steel H-pile that provides a six-inch web between a pair of opposing flanges with predrilled holes in the web, flanges or both to enable universal attachment to different tracker makers' systems.

H-piles are driven into the ground using a pile driver—a percussive tool that holds the pile at a plumb orientation and beats on the head of it repeatedly to incrementally drive it into the ground. Although the pile driver is a piece of standard equipment, given their prevalence in the commercial solar industry, certain equipment makers have begun manufacturing tracked pile driving machine specifically for solar developers.

Applicant has developed a novel multi-piece foundation system marketed commercially as EARTH TRUSS that is formed from below ground screw anchors, upper legs and an adapter that joins the legs to form and A-frame shaped truss. The screw anchors are installed adjacent one another, at opposing angles in a common, East-West plane. They are open at both ends allowing for a mandrel, drill or other tool to be extended through them while they're being driven into the ground. Anchors are driven with a combination of rotation and downforce while a separate tool actuates a mandrel or drill bit through the open screw anchor with a combination of rotation and hammering. To do this quickly and efficiently on the scale required for large, commercial solar projects requires the development of a machines and systems and methods for controlling such machines to performed automated screw anchor driving operations in a variety of driving conditions.

SUMMARY OF THE INVENTION

In order to maximize the value proposition offered by screw anchors relative to conventional H-pile foundations, installation must be simplified and must result in consistent and accurate positioning under a variety of driving conditions. To that end, various embodiments of the invention provide systems, method and machine for automated control of a screw anchor driving operation that drives a screw anchor to a specified depth of embedment.

Various embodiments of the invention provide a closed-loop feedback control system for controlling an automated screw anchor driving operation comprising a programmable logic controller (PLC) coupled to a non-volatile memory, a plurality of control nodes, controllable by the PLC, a plurality of sensors communicatively coupled to the PLC, and a control program stored in non-volatile memory, executable by the PLC to automatically drive a screw anchor to a target depth with the plurality of control nodes based at least in part on information received from at least one of the plurality of sensors while driving.

Various other embodiments of the invention provide a machine comprising an elongated mast, a motorized drive train extending along the mast, a rotary driver coupled to the drive train to move along the mast and to drive a foundation component, a tool driver coupled to the drive train to move along the mast and to operate a tool extending along the mast through the rotary driver and foundation component, and a closed-loop feedback control system, wherein the closed-loop feedback control system comprises a PLC executing a control program for automatically controlling the drive train, rotary driver and the tool driver to perform a driving operation based on information from a plurality of sensors monitoring the driving operation.

Further embodiments of the invention provide a method of performing an automated closed-loop feedback-controlled driving operation with a programmable logic controller (PLC) controlling a screw anchor driving machine comprising controlling a first motor to begin applying power to a drive train to operate the drive train at a first rate, controlling a rotary driver connected to the drive train to drive a screw anchor to advance at a rate that substantially matches first rate, controlling a tool driver connected to the drive train to begin rotating a tool at a second rate, the tool extending through the rotary driver and the screw anchor, monitoring data from a plurality of sensors, the data corresponding to output parameters of the first motor, rotary driver and tool driver, and based on the step of monitoring, changing the operation of at least one of the first motor, rotary driver, and tool driver.

DETAILED DESCRIPTION

The invention will now be described in the context of the drawing figures where like elements are referred to with like designations. This description is intended to convey a thorough understanding of the embodiments described by providing a number of specific embodiments and details involving automated methods, machines and systems for driving foundation components for single-axis trackers. It should be appreciated, however, that the present invention is not limited to these specific embodiments and details, which are exemplary only. Although the various embodiments of the invention may be especially useful for controlling and improving a driving process for screw anchors for single-axis trackers and other solar arrays, they may also be useful for controlling and improving the driving process for foundation components for numerous other structures. It should be further understood that one possessing ordinary skill in the art in light of known systems and methods, would appreciate the use of the invention for its intended purposes and benefits in any number of alternative embodiments, depending upon specific design and other needs.

Figure 1A:
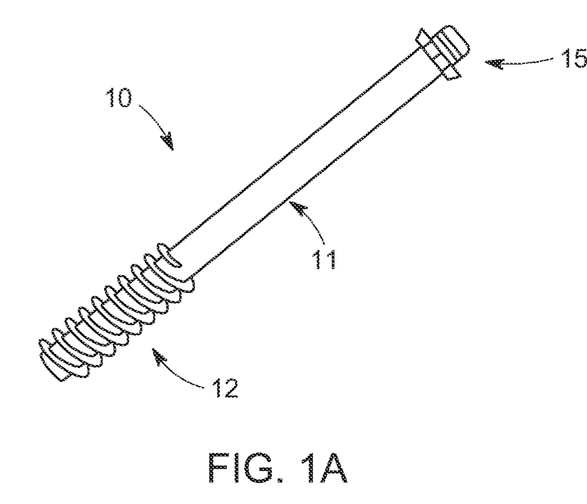
FIG. 1A is a perspective view of a screw anchor foundation component driven by the machine according to various embodiments of the invention.
Figure 1B:
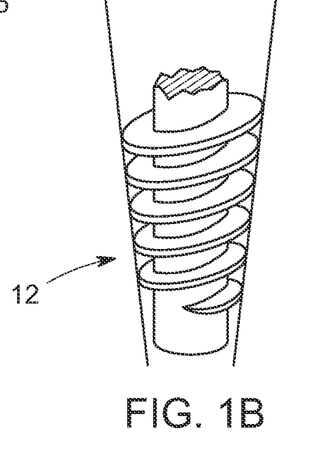
FIG. 1B is a close of up the threads 12 of the screw anchor shown in 1A.

FIG. 1A shows an exemplary screw anchor 10 usable with various embodiments of the invention. Screw anchor 10 consists of a hollow, substantially uniform diameter shaft 11 that is open at both ends with external threads 12 at one end and a driving collar 15 at the other. In various embodiments, threads 12 may have a tapered profile, as seen for example, in FIG. 1B, so that their outside diameter increases moving up the shaft to create a lead-in. This may help keep it on path while driving. The threads may also, in various embodiments, be tilted slightly upwards, that is, towards collar 15 to provide additional resistance to pull out. The length of screw anchor 10 may be variable depending on the desired depth of embedment (e.g., 1-2 meters). In the context of foundations for single-axis trackers and other axial solar arrays, embedment depth may be dictated by soil type, grade of land, torque tube height, among other factors. The inside diameter of the shaft may be between two and half and three inches and the thickness on the order of a few millimeters. It may be formed from galvanized alloy steel or other suitable material. In some cases, it may be coated with one or more additional anti-corrosion coatings such as fusion bonded epoxy, polyurethane, and acrylic among others. Driving collar 15 may be a separate cast structure welded on to the upper end of shaft 11 or, alternatively, may be stamped or otherwise formed in the upper end. Threads 12 may be welded to the outside of shaft 11 ad the lower end, may be attached with bent tabs or, in some cases may even be stamped into the lower end. The threads enable screw anchor 10 be driven into supporting ground with a combination of torque and downforce. The open end allows a drill or other tool to be extended through screw anchor 10 while the anchor is being driven into the ground to enable it to go through dense soil, rocks or other strata that might refuse the anchor itself.

Figure 2:
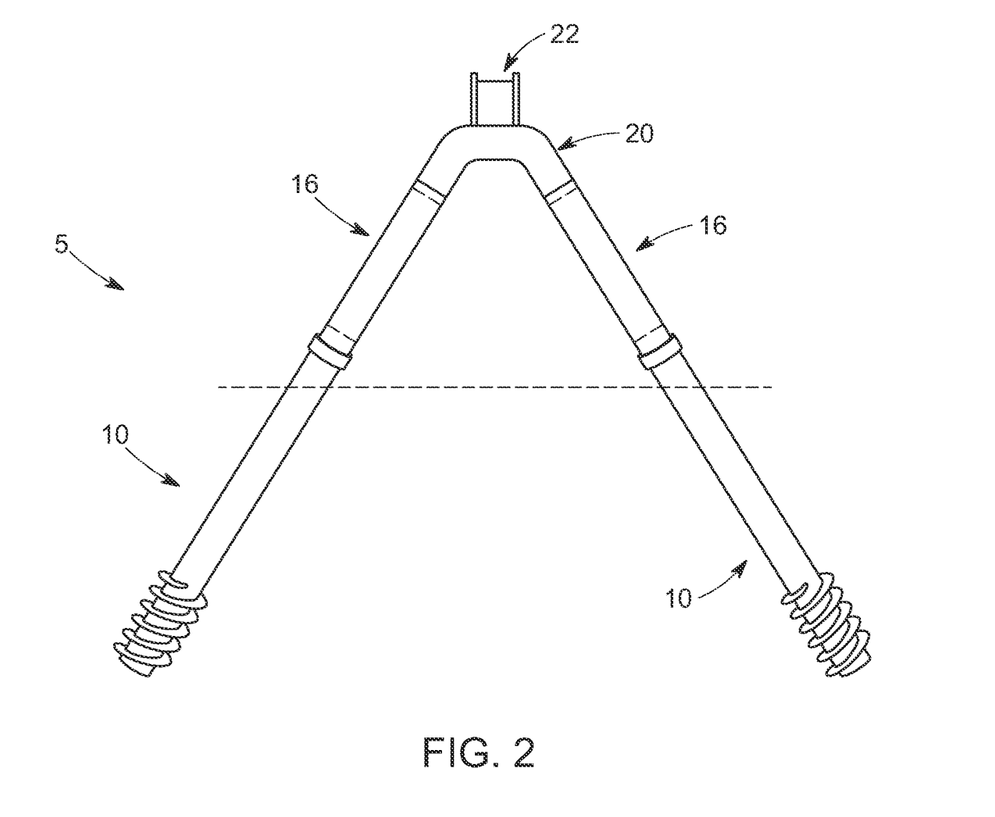
FIG. 2 is an exemplary EARTH TRUSS foundation in accordance with various embodiments of the invention.

The Applicant of this disclosure has proposed a new foundation system for axial solar arrays that reduces the amount of steel required to support an array relative to conventional H-piles and is based on screw anchor 10. One variant of this foundation system that is particularly well-suited for supporting single-axis trackers and known commercially as EARTH TRUSS, is shown in FIG. 2. The EARTH TRUSS system 5 shown in FIG. 2 consists of a pair of adjacent screw anchors 10 that have been driven into supporting ground at angles to one another on the East and West sides of an intended North-South line of a tracker row. Once anchors 10 have been driven to their target embedment depth, an upper leg 16 is attached to each anchor 10 via driving collar 15. In various embodiments, each upper leg 16 may be temporarily sleeved over one of the collars 15 while an adapter or truss cap 20 is fitted into the opposing ends of each upper leg 16 to complete the foundation. In various embodiments, the machine may include a jig or other device that orients the adapter or truss cap so that it is level and aligned with a laser line to be at the at the same Y (East-West) and Z (up-down) position as every other adapter in the current row. In various embodiments, once the adapter or truss cap 20 has been properly aligned, upper legs 16 may be crimped at each end, that is, at the areas of overlap with screw anchors 10 and with truss cap or adapter 20, thereby forming a rigid A-frame structure. In various embodiments, assembling the EARTH TRUSS at the time the screw anchors are driven will obviate the need for later alignment steps, such as when the tracker components are installed.

Exemplary adapter 20 shown in FIG. 2 consists of a pair of open connecting portions that, in this example, are received within respective upper legs 16, and a H-pile like mounting portion 22 that extends upward and approximates the web and flange geometry of a standard W6×9 or W6×12 H-pile. With this geometry, adapter 20 may support any tracker system that is designed to attach to an H-pile. It should be appreciated, however, that in other embodiments adapter 20 may take on a different geometry that includes an integrated bearing portion and/or that is optimized to integrate with one or more specific tracker systems. The various systems, methods and machines according to the various embodiments of the invention are agnostic as to which particular adapter is used. Regardless of which is used, in various embodiments the machine may provide a jig, bracket or other guide to hold the adapter at the desired orientation so that the EARTH TRUSS can be constructed in a fast, precise and repeatable manner.

Figure 3A:
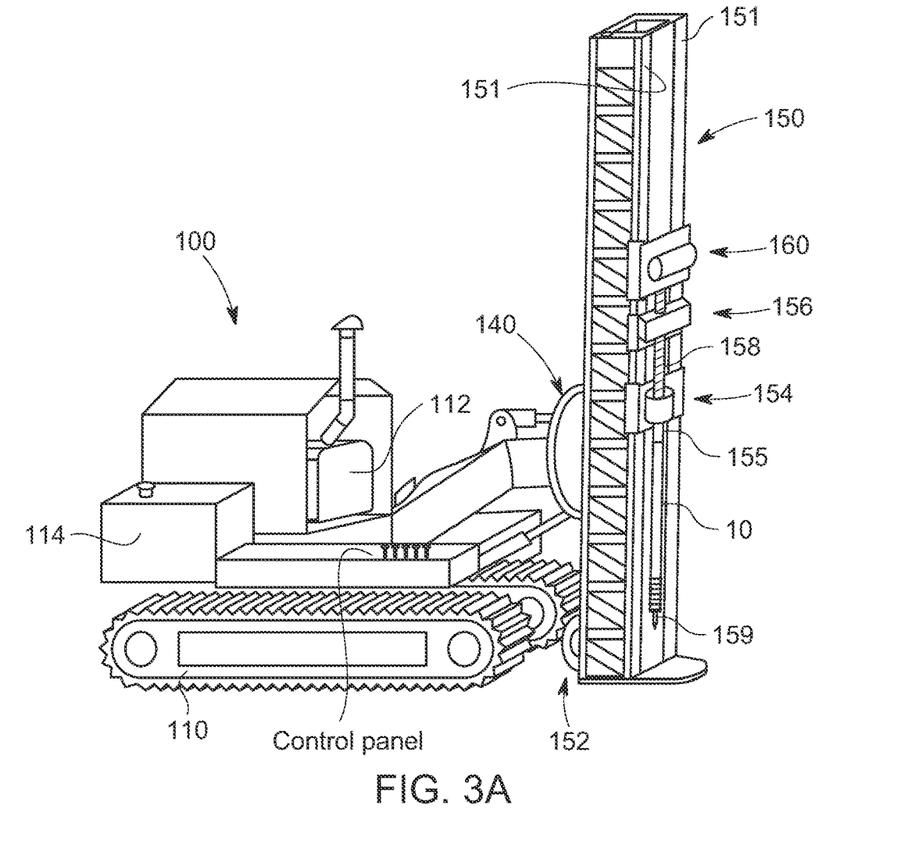
FIG. 3A is a perspective view of a screw anchor driving machine according to various embodiments of the invention.
Figure 3B:
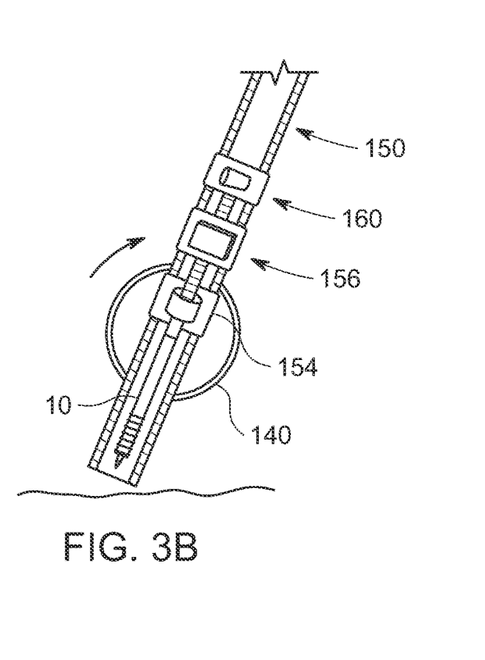
FIGS. 3B and 3C show a portion of the mast oriented at different driving angles.
Figure 3C:
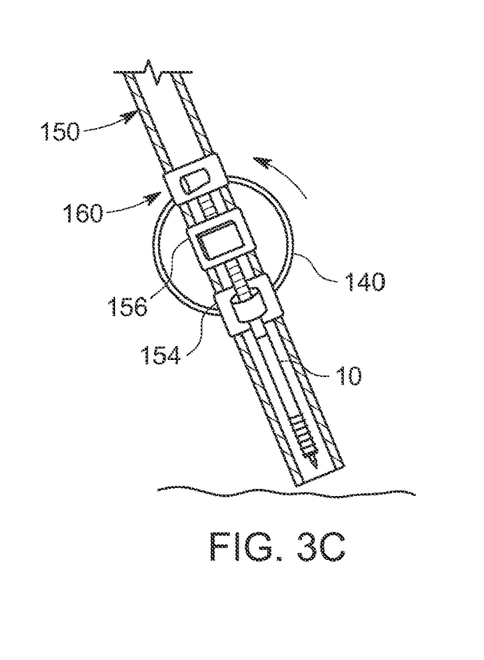

Turning to FIG. 3A, this figure shows a screw anchor driving machine 100 manufactured by the applicant of this disclosure and known commercially as the TRUSS DRIVER according to various exemplary embodiments of the invention. The TRUSS DRIVER is used to drive adjacent screw anchor pairs along the tracker row and to support the adapter, bearing adapter or other apex hardware while upper legs are attached. As shown, machine 100 is built on tracked chassis 110 with diesel motor 112 and a hydraulic drive system. It should be appreciated that future versions of the machine may be electrically powered. Such modifications are within the spirit and scope of the invention. Also, it should be appreciated that machine 100 could instead ride on tires, on a combination of tires and tracks, on a floating barge, on rails or on another movable platform.

Machine 100 supports articulating mast 150. In the figure, mast 150 is shown as an elongated ladder-like truss structure extending approximately 15-20 feet in the long direction. It is connected to machine 100 by one or more hydraulic actuators. In various embodiments, articulating mast 150 can move through an arc in at least one plane extending from the front to the back of the machine that spans approximately 90-degrees to allow mast 150 to go from a stowed position where the mast is substantially parallel to the machine's tracks to an in-use position where the mast is substantially perpendicular to them. Therefore, when mast 150 is in the stowed position, its height will be minimized, whereas when mast 150 is in-use, it will extend far above machine 100. In various embodiments, rotator 140 is positioned in front of the one or more actuators connecting mast 150 to machine 100 so that mast 150 may rotate through a range of angles about a point of rotation (e.g., plus or minus 35-degrees from plumb) so that screw anchors may be driven into the ground at a range of angles. This also decouples the driving angle from the left to right slope of the ground under the machine, allowing it to compensate for uneven terrain.

In various embodiments, in addition to rotating in plane, articulating mast 150 may move with respect to machine 100 so that it can self-level, adjust its pitch, and yaw and move in the X, Y and Z-directions (where X is North-South, Y is East-West, and Z is vertical) without moving the machine. This may be accomplished with additional actuators or slides that move an intermediate frame that supports rotator 140 and that is positioned between the rotator and machine 100. The components of machine 100 used to drive screw anchors, as opposed to positioning the mast, are mounted on mast 150. Mast 150 includes parallel tracks 151 that define the plane that those components move in. Therefore, the mast's orientation dictates the vector or driving axis that screw anchors are driven along. Alternatively, mast components may travel on wheels retained on a track running along the mast.

As shown, the driving components include screw or rotary driver 154 with chuck 155 that connects to driving collar 15 of screw anchor 10, and tool driver 156, located above the rotary driver. In various embodiments, rotary driver 154 may be powered by hydraulics or by electric current. Similarly, tool driver 156 may be powered by hydraulics, compressed air or electric current. In various embodiments, tool driver 156 is a hydraulic drifter that drives a tool consisting of shaft 158 and bit or tip 159 that extends along mast 150, passing through rotary driver 154, chuck 155 and the center of screw anchor 10. In various embodiments, and as shown in the figures, rotary driver 154 and tool driver 156 may be oriented concentrically on mast 150 in the direction of tracks 151 so that shaft 158 can pass through rotary driver 154 while it is driving a screw anchor. In this manner, the tool tip 159 may operate ahead of the screw anchor, projecting out of its open, lower end. In various embodiments, rotary driver 154 is loaded by sleeving a screw anchor over tip 159 and shaft 158 until it reaches chuck 155. Alternatively, tool driver 156 may be withdrawn up mast 150 until shaft 158 and tip 159 are substantially out of the way. Then, mast 150 can be moved to the desired driving vector. In some embodiments, this may comprise aligning the mast and then rotating it in the aligned plane. In other embodiments, the entire mast may be moved so that the point of rotation is oriented somewhere along the driving axis. This will insure that the driven screw anchor points at the desired work point. In various embodiments, an operator may then adjust a slide control for the mast to lower the mast foot 161 to the point where at least a portion of it reaches the ground. Then, the operator initiates an automated drive operation, that as discussed in greater detail herein, if successful, results in the screw anchor being driven to the desired embedment depth. When the operation is complete, tool driver 156 and rotary driver 154 travel back up mast 150 so that another screw anchor may be loaded before moving mast 150 in the opposing direction to drive the adjacent screw anchor so that the pair straddles the intended North-South line of the tracker row and points at a common work point.

Figure 4:
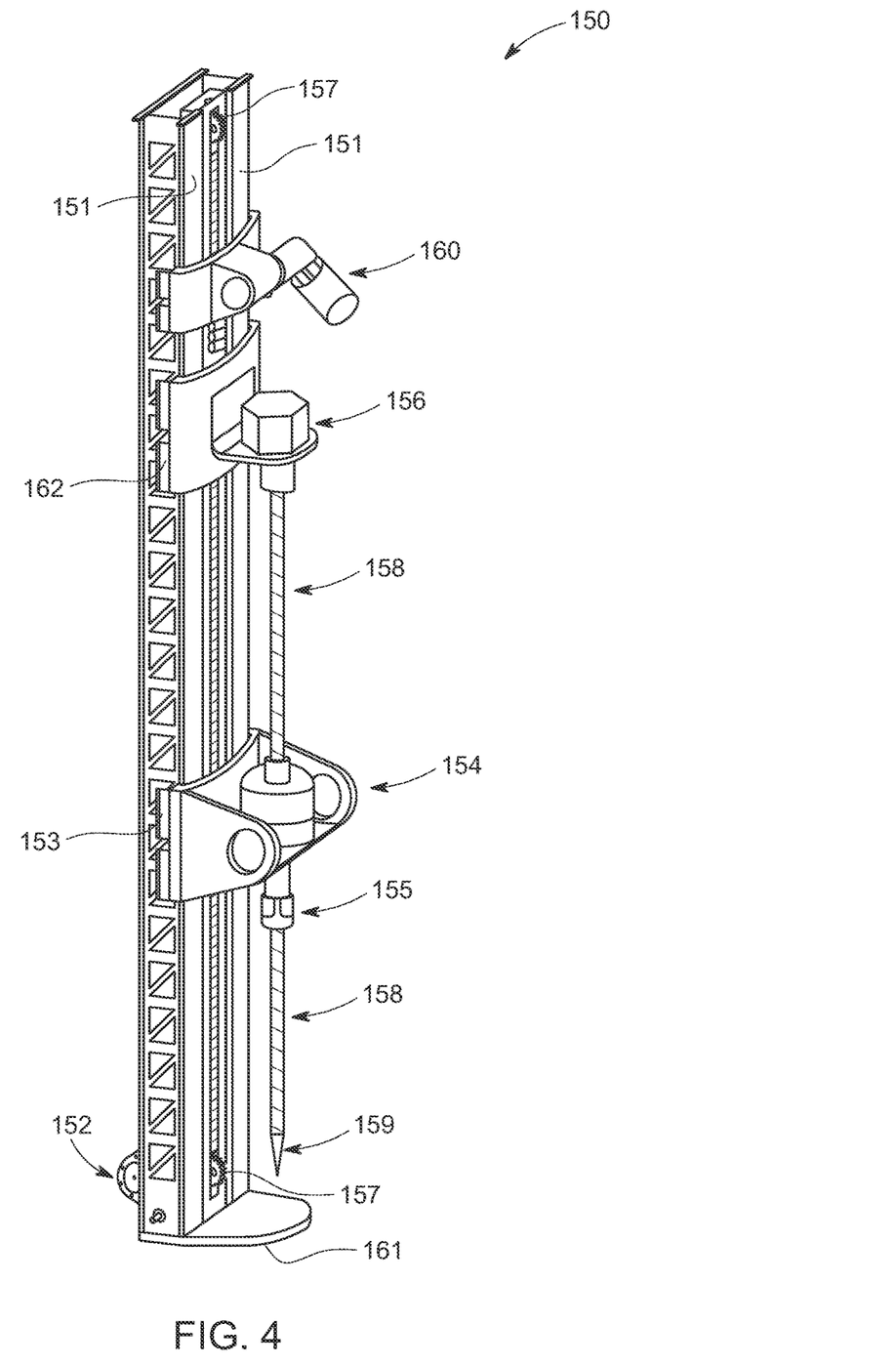
FIG. 4 is an isolation view of the mast and attached components of the machine of FIG. 3A.

FIG. 4 shows the mast of FIG. 3A and attached components in greater detail. Mast 150 is formed from elongated sections of steel that are welded together along the seams to form a structure with a generally box-shaped cross-section. Planar portions on opposing side edges of the outer face of mast 150 form tracks 151 running substantially the entire length of mast 151. In this exemplary system, lower crowd motor 152 is mounted near the base of mast 150 on the back side. In various embodiments, lower crowd motor 152 powers a drive train including heavy-duty single or multi-link chain 170 that runs substantially the entire length of mast 150 between a pair of chain tensioners 157 positioned at the top and bottom ends of mast 150. Lower carriage 153 is mounted on tracks 151 and is connected to chain 170 so that when lower crowd motor 152 pulls down on chain 170, carriage 153 causes rotary driver 154 to push down on the head of the attached screw anchor with the same force. As shown, rotary driver 154 is attached to lower carriage 153 so that the two move together. Rotary driver 154 includes chuck 155 on its lower portion that receives the head of a screw anchor and imparts torque and downforce to the head to drive it into the underlying ground. Upper carriage 162 is also tracked on mast 150 and attached to chain 170 driven by lower crowd motor 152. As shown, tool driver 156, in this example, a hydraulic drifter, is attached to upper carriage 162. Hydraulic drifters are often employed in rock drilling machines to provide a selectable combination of rotation and hammering depending on the type of bit used. Herein, the word "tip" in reference to element 159 is used generically to refer to the tool attached to the end of shaft 158 controlled by tool driver 156 and may be a drill bit (button, drag, cross, tri-cone, etc.), a pointed mandrel tip, or other suitable tool. As shown, tip 159 is controlled by tool driver 156 via a shaft 158 connected to the output of tool driver 156 and extending lengthwise down mast 150, through an opening in rotary driver 154 and out through chuck 155. With this configuration, tool driver 156 may impart torque and hammering force to tip 159 through rotary driver 154 and attached screw anchor 10 while rotary driver 154 is driving the screw anchor.

In various embodiments, tip 159 is maintained slightly ahead of the threaded end of screw anchor 10 to assist with embedment. In some cases, during a screw driving operation, lower crowd motor 152 may pull down on carriage 153 and carriage 162, causing both rotary driver 154 and tool driver 156 to travel down mast 150 at the same rate with tip 159 projecting out of the open, lower threaded end of screw anchor 10. In other cases, as discussed in greater detail below, it may be desirable for tool driver 156 to travel independent of rotary driver 154. To that end, upper crowd motor or drifter motor 160 also moves with chain 170 but may selectively disengage from chain 170 to move tool driver 156 independently. This enables tool driver 156 to extend tip 159 further past screw anchor 10 as well as to withdraw it without moving screw anchor 10 or rotary driver 154. This functionality may also be used to move upper carriage 162 in the opposite direction while lower carriage 153 moves down or remains in place.

With the configuration shown in FIG. 4, there are several components that must be individually controlled to effect a driving operation. For example, actuating lower crowd motor 152 will begin to pull lower carriage 153 and in turn rotary driver 154 towards the ground, supplying downforce to screw anchor 10 through the rotary driver 154. At substantially the same time, rotary driver 154 may be actuated to begin applying torque to the head of screw anchor 10. In various embodiments, it may be advantageous to start the driving operation by applying mostly downward pressure with lower crowd motor 152 because the top layer of soil is usually not structured enough to allow rotation to pull the screw anchor down without simply augering (i.e., drilling) the soil. Therefore, in various embodiments lower crowd motor 152 may be controlled to at least initially lead the driving operation while rotary driver 154 is controlled to rotate at a speed that advances screw anchor 10 at the same rate as crowd motor 152. In other words, if the crowd motor is pulling down at the rate of one meter per minute, and the pitch of the screw anchor threads is 0.2 meters (e.g., one revolution results in 0.2 meters of embedment), then the rotary driver may be operated at 5 revolutions per minute to keep pace with the rate of embedment attributable to the lower crowd motor. In practical application, at certain points during the driving operation, there may be reasons for operating the rotary driver slightly faster that this but mismatches between the rotary driver's rate of advance and the rate of advanced resulting from lower crowd motor 152 should be kept small. Even a 5% mismatch may result in augering or coring of soil.

Figure 5:
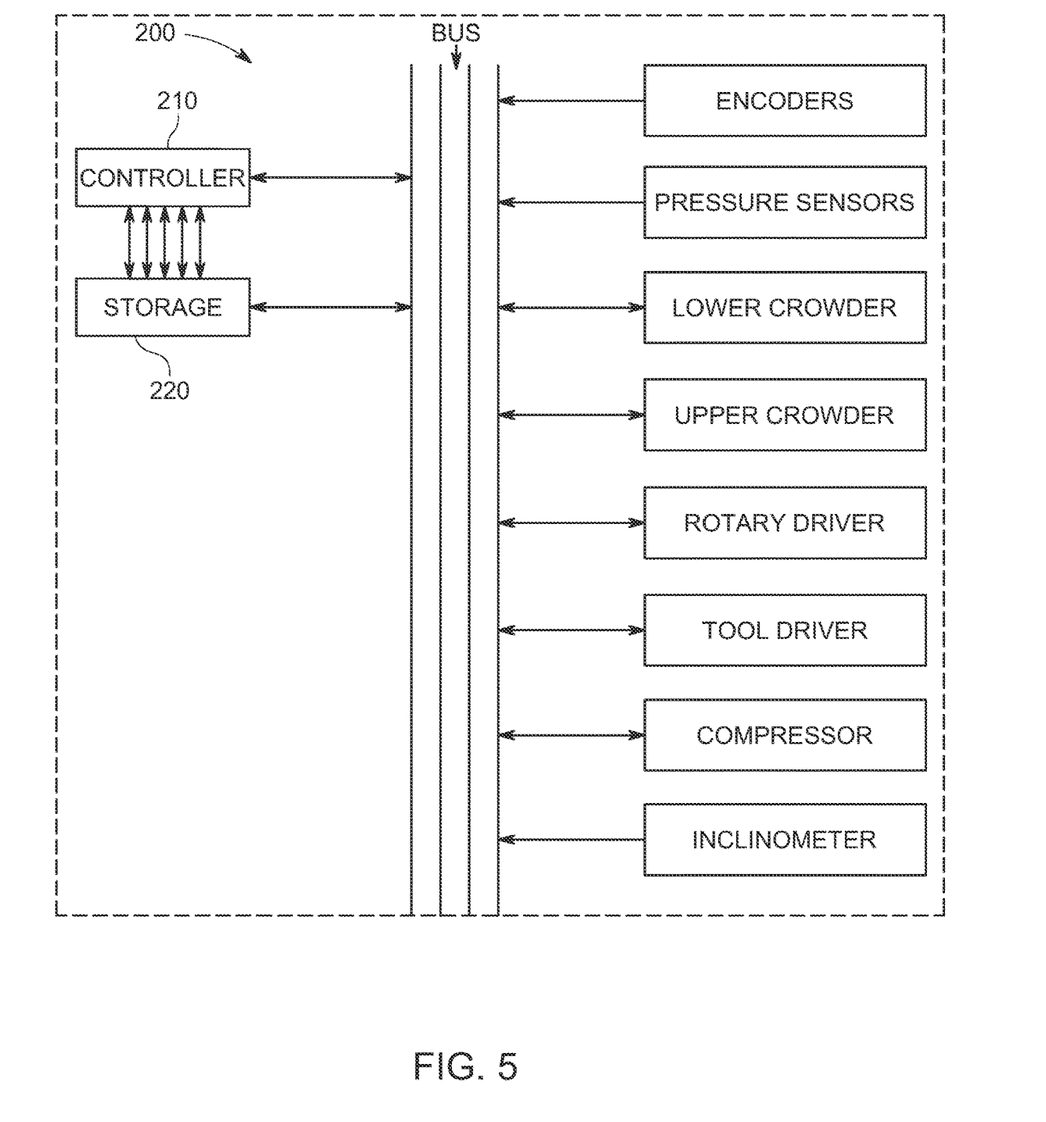
FIG. 5 is an exemplary control circuit usable with the various embodiments of the invention.

As shown, machine 100 has a series of manual hydraulic controls in a manual control panel as shown in FIG. 3A. These controls may allow manual control of the machine tracks as well the mast, the rotary driver, tool driver, lower crowd motor, and upper crowd motor. Notwithstanding these manual controls, maximum accuracy and driving throughput may in many cases be possible only by relying on machine automation. To that end, in various embodiments, machine 100 and mast 150 of FIGS. 3A and 4 may include one or more programmable logic controllers (PLCs) executing a control program that controls the driving functions of machine 100 and mast 150 and that uses real-time sensor data along with stored program code to control the operation of the lower crowd motor, rotary driver, tool driver and upper crowd motor to optimize the screw driving operation. FIG. 5 shows one possible configuration of a control circuit that may be used to accomplish this.

The heart of control circuit 200 in FIG. 5 is the PLC labeled controller 210 in the figure. The PLC may be an off-the-shelf black-box device from Rockwell Automation or other supplier or merely a circuit board containing a microprocessor and other necessary components that is mounted in a box on the machine and controllable via a user interface and/or remote control. Controller 210 may execute program code stored in non-volatile memory, labeled storage 220 in the figure. The program code executed by controller 220 may be written in structured text, instruction list or other suitable IEC 61131-3 textual or graphical programming language standard. As shown, controller 210 is connected to a communication bus that is used to relay sensor data and control signals between the circuit components. The bus may be a wired bus, such as an N-bit communication line, a wireless bus operating on one or more suitable wireless communication protocols (e.g., Wi-Fi, Bluetooth, Zigbee, ZWave, Digi Mesh, 2G-5G, etc.), or combinations of wired and wireless protocols. Multiple sensors are shown on control circuit 200 that provide real-time information to controller 210. In this example, these include encoders (e.g., linear and rotary encoders) used to incrementally count the movement of moving objects with respect to a non-moving reference, pressure sensors for measuring hydraulic pressure, downforce, air pressure, and/or resistance, among other variables. The sensors may also include one or more inclinometers used to facilitate self-leveling adjustment prior to driving, to determine the extent of roll adjustment needed to self-level, and also to monitor changes in level that occur during driving as the mast and machine lift-up in response to driving resistance. In some situations, it may be necessary to calculate the extent of such movement for the purpose or recalculating the embedment depth based on the machine's new position. Because such movement changes the location of reference locations on the mast relative to their location before driving started, linear and rotary encoders will not detect this type of movement, resulting in a failure to achieve the desired driving depth. Controller 210 may also receive real-time state information from lower crowd motor 152, upper crowd motor 160, rotary driver 154, tool driver 156, air compressor (not shown) and/or a hydraulic control system (not shown) and may send commands to these components as part of the automated control program for driving screw anchors. This could include output torque, rate of rotation, rate of travel, etc. The direction of the arrows shown in control circuit 200 indicate the direction of information flow. Controllable nodes (e.g., upper crowd, lower crowd, etc.) have two-way arrows while sensors merely transmit information and therefore are connected with one-way arrows. Though not shown here, a separate power bus may supply power and/or hydraulic pressure to one or more of the nodes.

The storage 220 may also contain information generated during driving operations. In various embodiments, it may be desirable to store acquired information remotely (e.g., in a cloud-based database) because it may be useful to have this information stored with other information about the job site that is not necessary for operation of the driver control system. Therefore, the circuit may store this information temporarily and transfer it to available cloud-storage via the bus when in proximity to a network or via a USB port or SD card. Alternatively, a smartphone application or other external device may be used to initiate transfer of this data. In various embodiments, stored information may include information corresponding to a solar tracker foundation installation job, such as, for example a single-axis tracker, including high level information about a job including job owner, system operator, location, maps/images, the type of system, size of the system, components of the system and job plans (e.g., what size/type foundations to install where). Stored information may also include information generated during driving operations including the specific location where foundation components were driven, sensor data received during the driving operation, control signals send to controllable nodes (e.g., lower crowder, upper crowder, rotary driver, tool driver, etc.).

Figure 6:
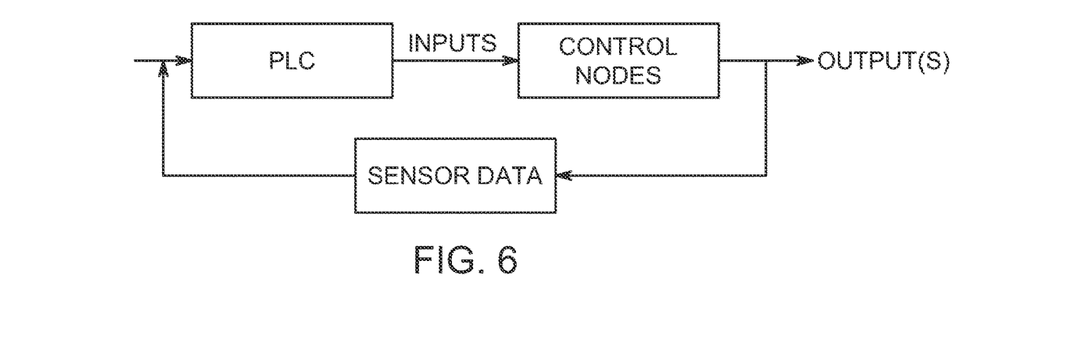
FIG. 6 is a block diagram showing a feedback control loop usable to provided automated control of a screw anchor driving machine according to various embodiments of the invention.

One method of automated machine control that may be particularly useful with the various embodiments of the invention is closed-loop feedback control. Closed-loop feedback control may be used to optimize driving time, respond to driving conditions, and to prevent damage to the equipment as well as the anchor itself. To that end, FIG. 6 shows an exemplary feedback control loop for the screw anchor driving machine according to various embodiments of the invention. The feedback control loop is a virtual structure formed from a programmable logic controller (PLC) that executes a control program sending information to control nodes and receiving information from sensors connected to the output of the control nodes. Therefore, the three components shown in FIG. 5 are distributed on the machine and connected by information flows. Portions may be implemented as a computer, a circuit board, an application specific integrated computer (ASIC), firmware or a combination of hardware and software. Portions may reside in a standalone enclosure communicatively coupled to the control nodes by physical connection or via one or more wireless communication links.

Closed-loop feedback control is often employed in automated processes to keep systems operating at their desired set point. Generally speaking, sensor data from the output is monitored in real-time and that data is compared to the current set point. If necessary, adjustments are made to the inputs to achieve the current setpoint. In the context of the present disclosure, the inputs are supplied to the control nodes to impact the screw anchor driving process. The inputs could be instructions from a user interface (e.g., initiate a screw anchor driving process) or lower level inputs like control signals from a controller to an actuator to cause the actuator to perform a process step in the screw anchor driving process (e.g., power the lower crowd motor to provide a specific amount of force, power the rotary driver to spin at a specific rate, etc.). Sensors capture output parameters (e.g., rate of penetration, rotational speed, pressure, etc.) and that information may be communicated back to the PLC or controller so that it can determine if the output is consistent with the set point. If not, the PLC may adjust an input to one or more of the control nodes to achieve the desired setpoint.

In the context of the screw anchor driving machine according to the various embodiments of the invention, the tool driver may communicate the real-time magnitude of the downward force it is exerting on the drive train and/or the rotary driver, the amount of resistance force it is experiencing, and/or the frequency and force of hammering by the tool driver. Similarly, the rotary driver may communicate its real time speed of rotation, direction of rotation, rotary pressure, and/or rate of advance. This information may be used by the PLC to optimize each installation and to quickly manage exceptions (e.g., when driving slows or stops completely). The PLC may store one or more tables of optimal operating parameters or ranges of parameters in non-volatile memory and issue commands to control nodes (e.g., rotary driver, tool driver, etc.) to maintain performance at or near the optimal parameters or within a range of acceptable parameters. The PLC may also store this information corresponding to the driving process for each pile in association with a location and/or other identifier for that pile. This information may be useful post-installation for the project developer, financier, geotechnical engineer or other interested party for validation or other purposes.

Also, by employing feedback control, adjustments to the tool driver and/or rotary driver may be made in real-time to prevent equipment breakage and alert the machine operator of a refusal or other condition so that a manual mitigation protocol can be initiated. With pile driving, where the operator is simply beating on the head of the pile (e.g., H-beam or I-beam), there is little downside to trying to beat through a temporary refusal. However, when driving a hollow, threaded screw anchor with a rotary driver it is important not to attempt to blindly drive through a refusal because the threads may start augering the hole as the anchor spins in place. In the worst case, continued pressure by the rotary driver could damage the screw anchor. The feedback control loop allows these conditions to be detected quickly and for mitigation techniques to be automatically employed before either the soil or anchor are damaged. For example, if ground penetration slows or stalls, or the machine begins to lift up, the feedback controller may control the upper crowd motor to make the tool driver move ahead of the screw anchor and/or may control the tool driver to increase a rate or force of hammering while pausing the rotary driver to try to breakup whatever is impeding the screw anchor's progress. After a certain amount of time elapses or after the drill or tool has penetrated far enough beyond the anchor (i.e., to an acceptable depth), indicating that the refusal has been mitigated, the controller may control the rotary driver and lower crowd motor to resume the driving operation. All of this may be done without the need for an operator to be closely monitoring performance parameters of machine.

Continuing with this example, if the tool driver and tool or bit is unable to penetrate the obstruction, as detected by the inability to make the tool penetrate any deeper after a predetermined amount of time, the controller may send a signal to a user interface, indicator light or other device to alert the operator that a refusal has occurred. In some embodiments, as will be discussed in greater detail below, this may cause the operator to withdraw the tool to replace the bit or even to reverse the screw anchor.

Figure 7:
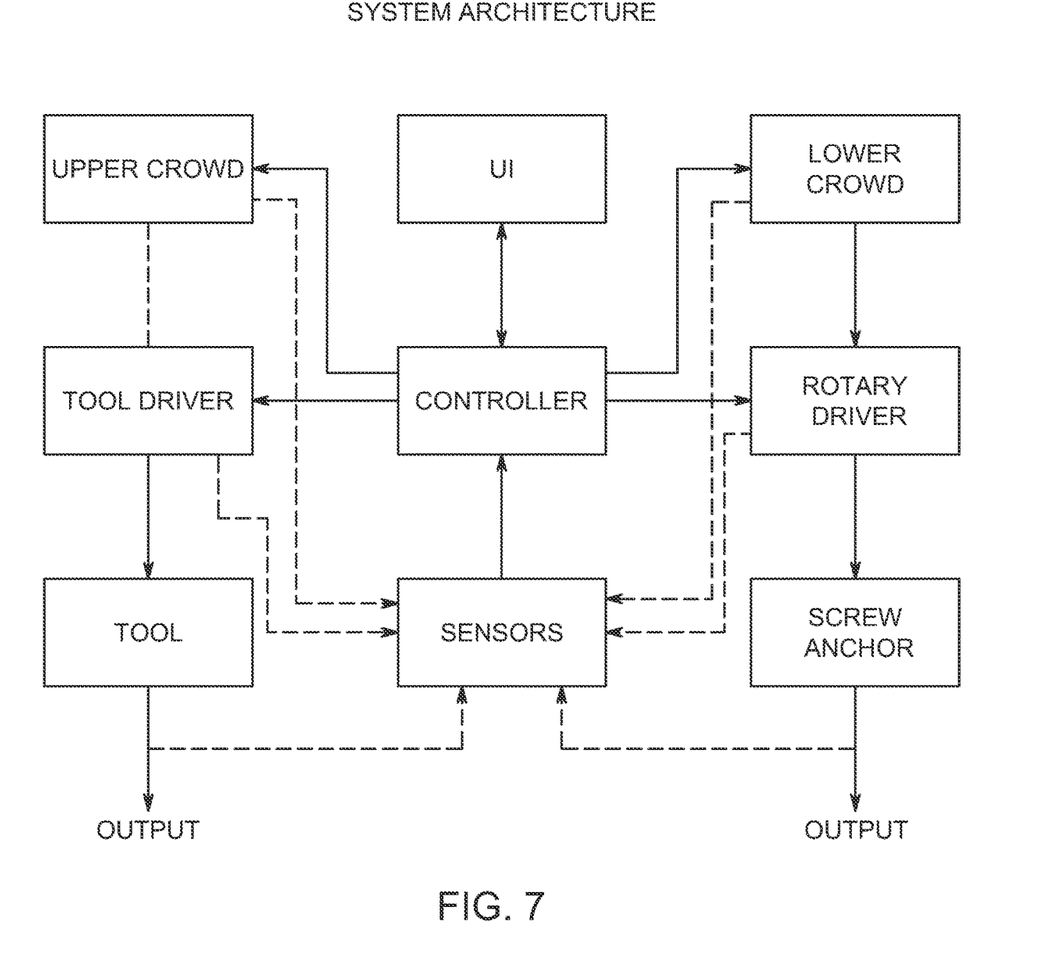
FIG. 7 is a block diagram showing an exemplary control system architecture for a screw anchor driving machine according to various embodiments of the invention.

FIG. 7 is a functional block diagram showing elements of a virtual system to perform closed-loop feedback control such as that shown generically in FIG. 6 of a screw anchor driving machine such as that shown and discussed herein. In the context of this figure, virtual designates the fact that these elements are communicatively coupled to form a system but not contained in a single discrete enclosure. In fact, they may be distributed around the machine. In this exemplary architecture a single controller controls all system components and performs feedback control. In practical application there may be two or more controllers. The box labeled controller here may be one or more PLCs, microcontrollers, computers, PC boards, or other known computing device. The controller may receive inputs and send outputs to a user interface device, labeled U/I in the drawings. The U/I may be digital touch screen, a set of knobs, dials and buttons (e.g., physical user interface), lights, speakers, and/or other indicators that is mounted on the machine. Alternatively, the U/I may reside on a separate device (e.g., smartphone app, remote control, etc.) and communicate the other system elements via a wired or wireless communication protocol such as Wi-Fi, Bluetooth, ZigBee, 3G, 4G, LTE, etc. The user interface is used to send commands that are translated by the controller into machine language and sent to the various control nodes (e.g., machine, mandrel driver, rotary driver, upper/lower crowd motors, etc.). The user interface is also used to receive information from the controller such as status information, real-time operating parameters, and alerts.

In this diagram, the control circuit is coupled to four control nodes that include the upper crowd motor, lower crowd motor, tool driver, rotary driver. The tool driver may include a control interface to a separate compressor on the machine to release pressurized air via the tool or the controller may control the compressor directly. The upper crowd motor, lower crowd motor, tool driver and rotary driver each include a control interface that enables the PLC to control input settings such as speed, pressure, and mode of operation (e.g., hammering, rotating or both). In various embodiments, the screw anchor and tool, connected to the output of the rotary driver and tool driver respectively, are inanimate metal objects without any circuitry or control interface other than the physical interface to the drivers that control them. However, one or more sensors may be positioned proximate to the screw anchor and/or the tool to detect vibration levels, sound waves, hammering frequency, force, penetration rate, tool position relative to the screw anchor, or to quantify other detectable phenomena that may be indicative of the real-time operating conditions. This information may be sent to the controller as its obtained so that the controller can optimize the driving process and detect refusals before the mandrel or pile are damaged.

Figure 10:
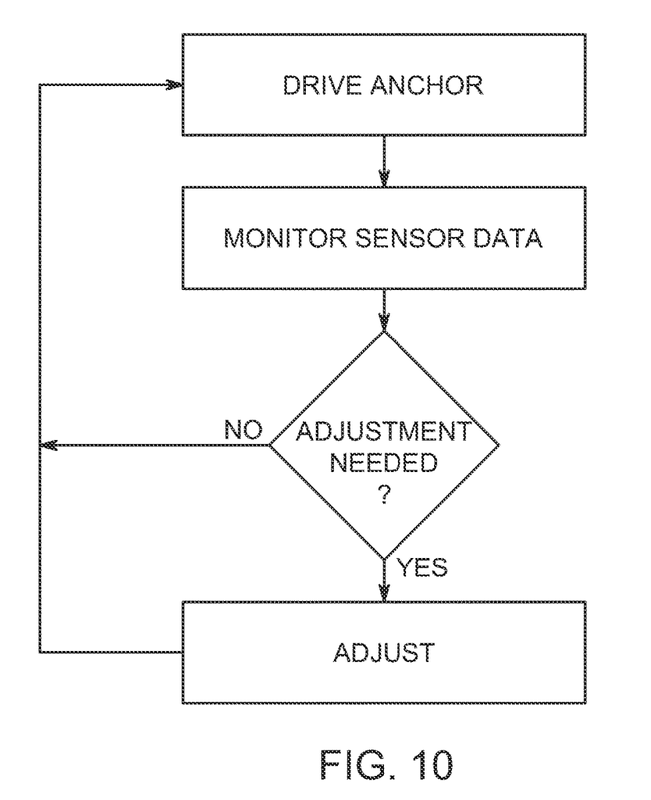
FIG. 10 is a flowchart showing the steps of an automated method for driving screw anchors with closed-loop feedback control according to various embodiments of the invention.

Turning now to FIG. 10, this figure is a flow chart showing the steps of a general method for controlling a driving operation according to various embodiments of the invention. The method begins after the machine has been moved to the desired driving location, a screw anchor loaded on the rotary driver, and the mast oriented to the desired driving vector. In various embodiments, machine control begins with an operator hitting a button or selecting a control on the user interface to initiate the driving process. In various embodiments, this will cause the controller to activate the lower crowd motor to power the drive train and rotary driver to begin rotating. In various embodiments, this may also cause the tool driver to move down the mast via the power train. If the tool driver is coupled to the drive train, the tip portion of the tool will move with the screw anchor at the same speed. In some cases, the tool driver may simply impart downforce to the tool through the screw anchor. In other embodiments, it may by default hammer as it travels down and/or release pressurized air from the tip. In various embodiments, as soon as the driving operation begins, the controller will begin monitoring data received from the array of sensors. Some of this information will be operating parameters of these respective control nodes, including their input power, operating speed, etc. Other information may include sensed information such as rate of penetration, resistance to the mandrel (as indicated by vibration or other measurable metric), position of the anchor relative to the mandrel, and depth of the pile. The controller monitors this information in real-time so that the controller can determine whether any operating parameters (e.g., system inputs) need to be adjusted to keep the driving process within specification and/or to mitigate a refusal or other unstable condition. This may entail altering the rotational speed and/or the feed rate of the rotary driver, or even pausing it completely to provide time for the tool to clear a rock or other obstruction. Monitoring the sensor data may also involve confirming whether the target depth has been reached enabling the driving process to end. Otherwise, operation may continue iteratively until the target depth is reached. In various embodiments, if tool travels down ahead of the screw anchor, it may create a void ahead of the screw anchor. Therefore, in various embodiments, if the tool reaches the target depth, the controller may decouple the tool driver from the drive train or begin withdrawing it so that the screw anchor can continue to be driven into the void.

Figure 11:
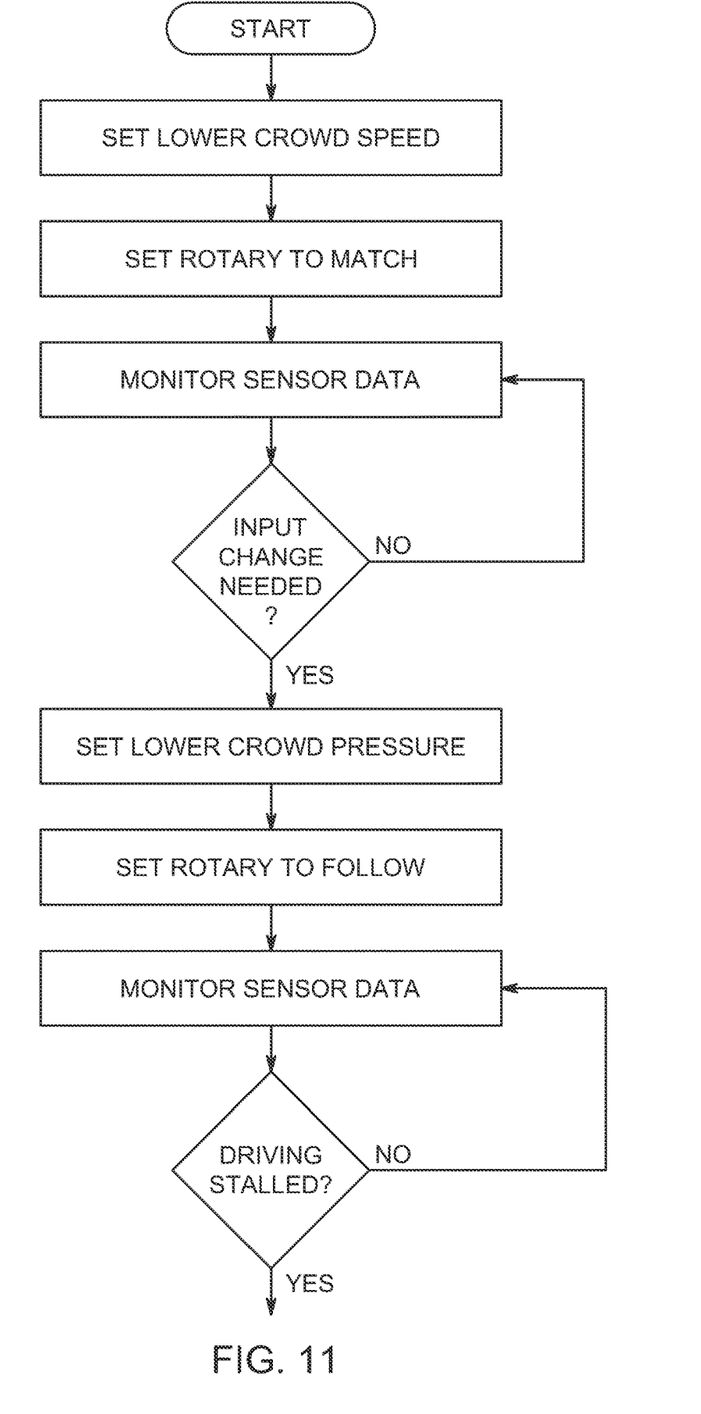
FIG. 11 is a flowchart showing the steps of a control routine for controlling a screw anchor driving machine to accomplish an automated screw diving operation according to various embodiments of the invention.

Turning to FIG. 11, this figure is a flow chart detailing the steps of an exemplary control program executed by the PLC for performing an automated screw anchor driving operation with a machine according to the disclosure. In various embodiments, the method begins with setting the speed of the lower crowd motor, and by extension the drive train, to a specified rate of travel. This causes the chain to move down, pulling the carriage carrying the rotary driver, and if desired, the carriage carrying the tool driver. In various embodiments, the PLC may also cause the tool driver to begin rotating, hammering and/or discharging pressurized air from the tool. In various embodiments, the PLC will control the rotary driver to rotate at a rate causes the screw anchor to advance via the threads at a rate that substantially matches the specified rate of travel. In the initial stage of driving, the anchor is breaking through the upper layer of dirt. This soil may not have sufficient structure to enable the threads to pull the screw down so, for this reason, the lower crowd motor may initially lead the driving operation. As the driving operation continues and the screw anchor begins to penetrate the ground, sensor data is being received by the PLC. In various embodiments, the PLC is programmed to detect from the sensor data that resistance to the driving operation is increasing. This may be indicated by a change in the rate of travel, uplift on the mast or other detectable phenomena. This detection is reflected in the flow chart by the decision box labeled "input change needed".

For at least the first few seconds of the driving operation, the PLC may, based on the received sensor data, determine that the operation should continue with the current inputs. If, however, the PLC determines that an input change is needed, such as, for example, because the screw anchor has penetrated sufficiently far that the threads are catching solid Earth, the PLC may control the lower crowd motor to impart a fixed amount of pressure (e.g., 2000 pounds) to the drive train rather to try moving at a fixed rate of speed. In various embodiments, this pressure is set to a level that reduces the chance of damage to the screw anchor. This will result in the carriage carrying the rotary driver, and if necessary, the tool driver, down the mast at variable rate, depending on soil conditions. In various embodiments, the PLC will continuously calculate a rotary speed for the rotary driver that will advance the screw anchor at the same variable rate to prevent augering. Driving will continue with the lower crowd outputting the fixed pressure, the rotary driver matching, and the PLC monitoring sensor data for information indicative of a stall. If no stall is detected, the PLC may maintain the status quo and allow the rotary driver, lower crowd and tool driver to continue attempting to drive the screw anchor to the target depth. Otherwise, if a stall is detected, operation flow may transition to a mitigation process, reflected, for example, in FIG. 12.

Figure 12:
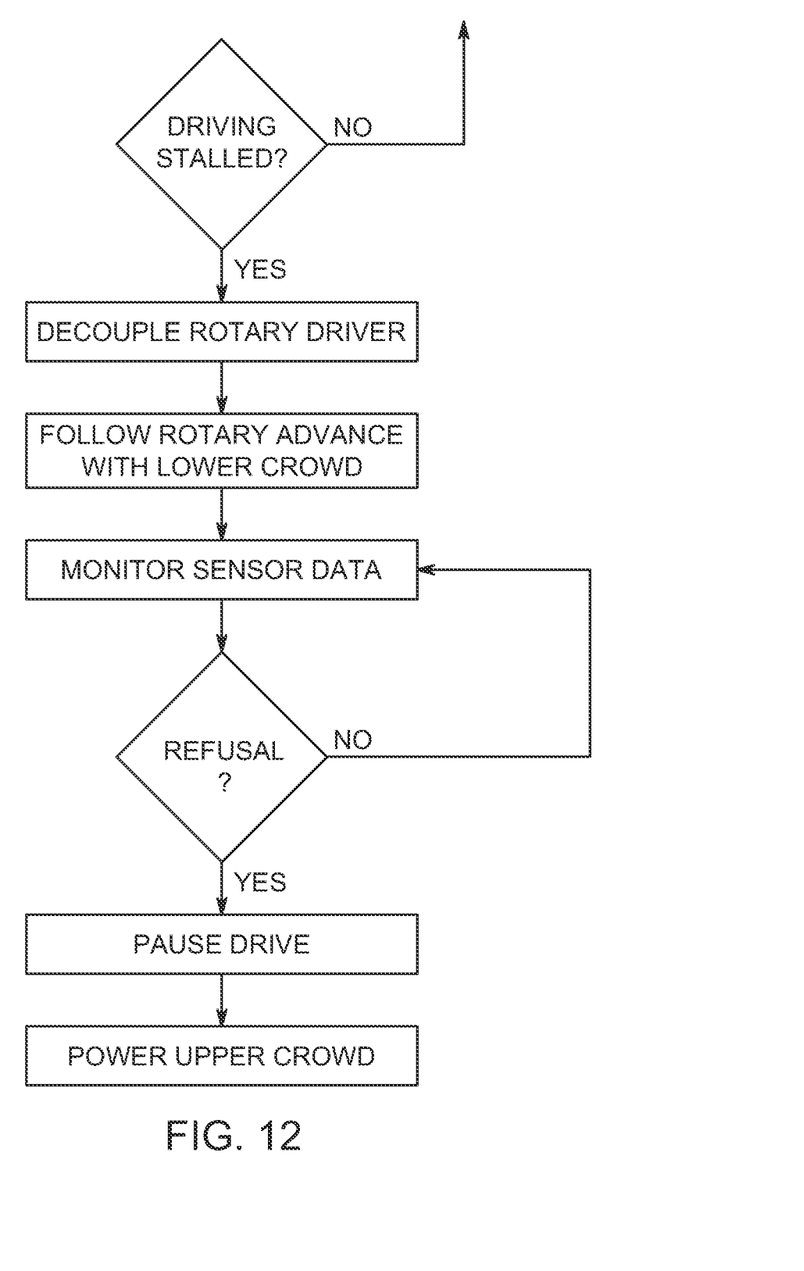
FIG. 12 is an extension of the flowchart of FIG. 11.

If, based on received data, the controller determines that driving has stalled or slowed to a rate that warrants mitigation, the rotary driver may be slowed to near zero output as the lower crowd is unable to embed the screw anchor any further. In this case, it may be possible for the rotary driver to pull the anchor out of the stall. Therefore, the controller my decouple the rotary driver from the lower crowd and attempt to use rotation to pull the screw anchor down. In various embodiments, the controller will control the lower crowd to follow, providing downforce at a rate that matches any progress made by the rotary driver. This mode of operation may continue while the controller monitors sensor data to determine its efficacy. If it is working, operation may continue with the current strategy. Otherwise, if the controller determines that a refusal has occurred (e.g., further rotation/downforce, fails to result in further embedment), the controller may halt the driving operation by pausing rotary driver and the lower crowd motor. In various embodiments, the controller engages the upper crowd to separate from the drive train and to apply hammering, rotation and/or release or pressurized air through and ahead of the screw anchor while the screw anchor rests in place to break up and clear any obstruction in front of the screw anchor causing the refusal. In various embodiments, this may continue for a fixed period of time, for a fixed distance ahead of the screw anchor, or both. Alternatively, the controller may put the upper crowd in a mode of manual control while the driving operation is paused to allow an operator to decide how far and for how long to try to drill ahead of the screw anchor. If manually controlled, the operator may input a command to resume the automated driving process where the lower crowd and rotary driver are actuated to attempt to further embed the screw anchor. Otherwise, in autonomous mode, the controller may automatically resume the driving operation after the upper crowd has been operated for the fixed period of time or has achieved the fixed distance of travel.

In the event that mitigation via the upper crowd is unsuccessful, the controller may terminate the driving operation and provide a signal to the operator via the user interface so that the operator may extract the drill to try a different bit, reverse the screw anchor or perform another offline mitigation technique. It should be appreciated at that in parallel to the operations shown in FIGS. 11 and 12, the controller may be monitoring the sensor data for the current drive operation to confirm whether the target embedment depth has been reached, and if so, will end the driving operation.

Figure 13:
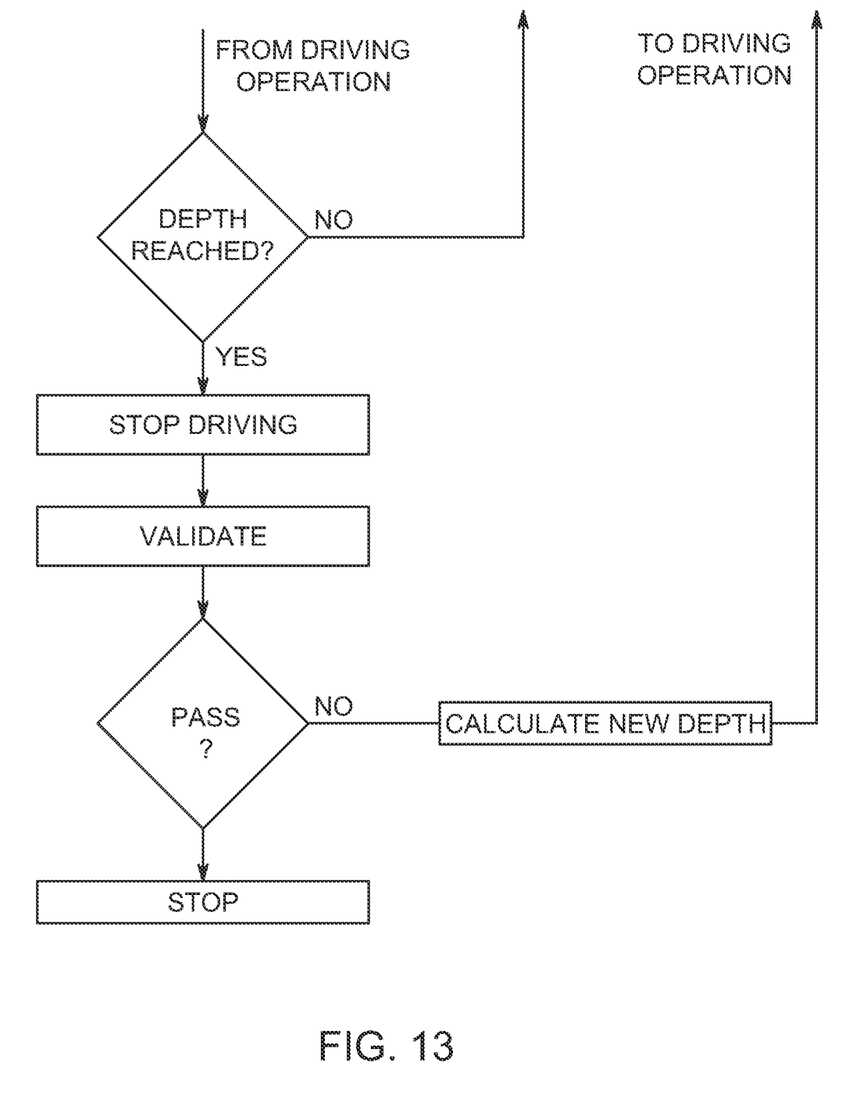
FIG. 13 is an extension of the flowchart of FIGS. 11 and 12.

In addition to confirming whether or not the driving operation has stalled, the controller may also monitor during the driving operation whether the desired embedment depth has been reached, as shown in FIG. 13, so that the operation can be stopped. In various embodiments, this may be determined by the controller based on information supplied from one or more sensors on the machine and/or mast. In some embodiment, when a determination has been reached that the target embedment depth has been reached, the operation ends by retracting the drilling tool and rotary driver on the upper and lower crowds respectively, up the mast, leaving behind the driven screw anchor. In other embodiments, a validation test may be performed on the driven screw anchor. This may be accomplished by inserting a pin or other device to prevent disengagement from the rotary driver, by attaching some other structure, or may actuation of an electromechanical device on the chuck. In various embodiments, the validation process commences by supplying a fixed amount of pressure to the lower crowd via the lower crowd motor to pull upward on the driven screw anchor for a given amount of time. In various embodiments, while this happens, one or more sensors, such as linear encoders, inclinometers or other devices will monitor movement of the lower crowd and/or other components to measure any displacement. In various embodiments, any measured displacement is supplied to the controller so that the controller may determine whether or not that displacement exceeds a predetermined threshold, that is, passed or failed the validation test. If not, that is, if the driven screw anchor passes, operation may stop. Otherwise, if the displacement exceeds the predetermined threshold, that is, the driven screw anchor does not pass, a new embedment depth is calculated and operation proceeds to the driving operation shown at flow chart beginning at FIG. 11.

Figure 8A:
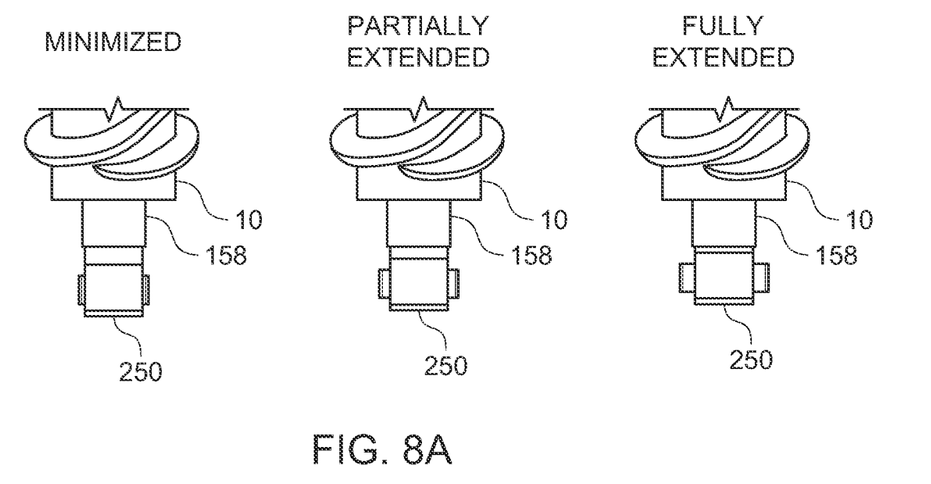
FIG. 8A shows an expanding drill bit in different stages of deployment according to various embodiments of the invention.

Turning back to FIGS. 8A and 8B, these figures show a drill bit usable with various embodiments of the invention under automated feedback control to adjust the driving process based on real-time conditions to optimize the process. Starting with 8A, this figure shows drill bit 250 according to various embodiments that is controllable to dynamically adjust its bore diameter. In the first image of 8A, the bit's bore diameter is minimized. In various embodiments, this may be default configuration. In the second, lateral cutting surfaces 254 have been partially extended, widening the bore hold created as the bit is rotated. In the third image, lateral cutting surface 254 have been fully extended to maximize the bore. In various embodiments, the controller according to various embodiments, of the invention may increase or decrease the bore of bit 250 in response to information received from one or more of the sensors during a driving operation. For example, if under constant pressure from the lower crowd, the driving operation is beginning to slow, the controller may cause the drill bit bore to increase to clear a wider path ahead of the screw anchor. If this is effective, the controller may continue the drive operation at this wider bore. Otherwise, if not, the controller may increase the bore further an attempt to increase the rate of embedment. Similarly, if embedment is going to fast the controller may scale back the bore diameter to insure that the screw anchor's threads are engaging the walls of the bore hole well enough to provide resistance to axial force.

Figure 8B:
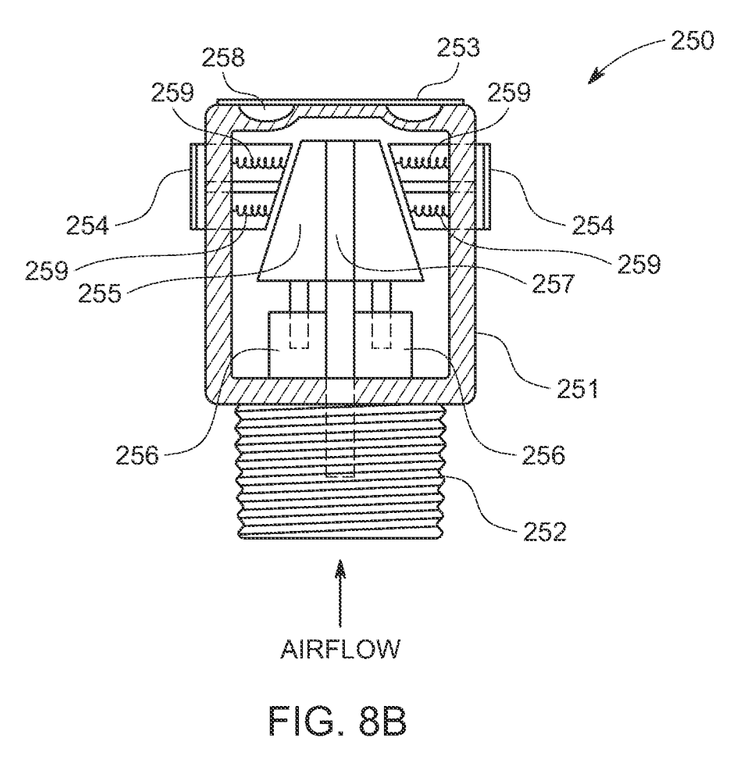
FIG. 8B is an isolation view showing internal components of the drill bit of 8A according to various embodiments of the invention.

In various embodiments, selective deployment of lateral cutting surfaces 254 may be accomplished with a drill bit having one or more actuators such as bit 250 shown in FIG. 8B. Bit 250 has a main body 251 and a threaded shank 252 that is open to receive pressurized air via air inlet 257. In various embodiments, pressurized air is communicated to bit 250 via an air passage in the elongated shaft connecting bit 250 to the tool driver of the machine. In various embodiments, actuators 256 may be used to selectively push wedge 255 towards the front end of bit 250, applying pressure against biased lateral cutting surfaces 254. In various embodiments, cutting surfaces 254 will have one or more springs 259 that are keep surfaces 254 in the minimized position unless wedge 255 is actuated forward. In various embodiments, air outlets 258 allow pressurized air to escape the bit so that spoils may be blown around the bit and up the screw anchor. Actuators 256 may be electronically controllable by the controller or may be controlled passively with air pressure or fluid pressure.

Figure 9:
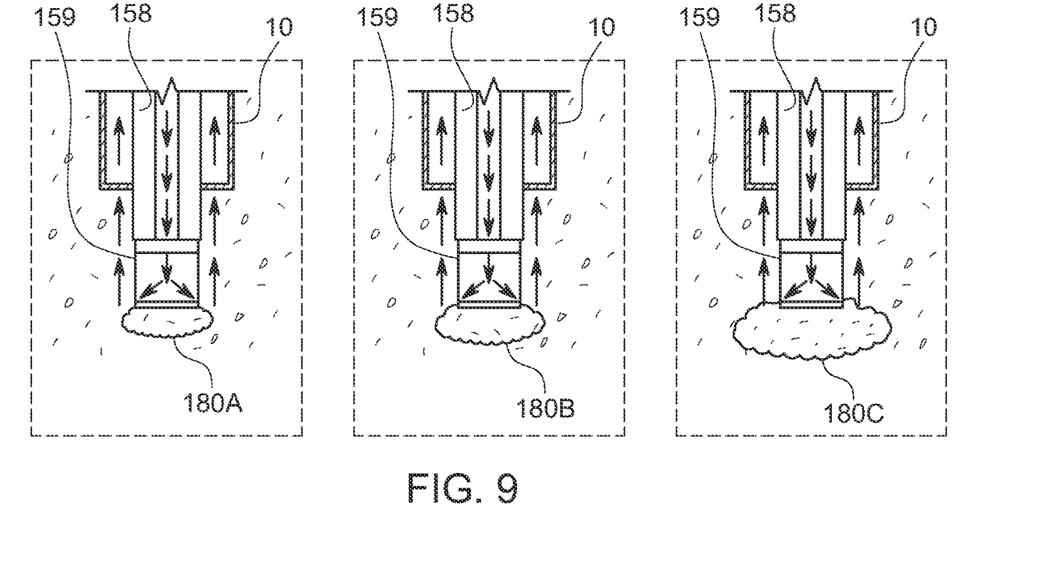
FIG. 9 shows a drill bit discharging varying volumes of air pressure during a driving operation in accordance with various embodiments of the invention.

Turning now to FIG. 9, this figure shows how the volume of air discharged via the tool bit 159 may be used as controllable variable by the controller to optimize the driving process. In some soils, such as caliche, high pressured air may function as a drill blowing rock and sediment out of the way. However, it is possible that a high-powered air compressor capable of discharging more than 100 cubic feet per minute, will actually blow out the ground ahead of it, leaving no material for the threads of the screw anchor to engage with. For example, if the driving operation is starting to stall and the controller control the tool to begin releasing pressurized air, the air may blowout the entire hole, creating a void larger than the diameter of the screw anchor, effectively blowing out the hole. Therefore, in various embodiments, it may be helpful to control the volume of air per unit of time that passes into the shaft and out of the bit as a controllable input to use air selectively and under feedback control to optimize the use of pressurized air gradually rather than in a Boolean on or off sense to prevent blowing out the hole.

To that end, FIG. 9 shows tool shaft 158 and bit 159 ahead of screw anchor 10 discharging 3 different volumes of pressurized air 180A, 180B and 180C and the corresponding effect of this air on the drill bore. By allowing the controller to control the discharge of pressurized air with granularity and to measure the effect, it may be used more effectively to drive screw anchors into certain soils with less risk of compromising the bore hole with too much air.

The embodiments of the present invention are not to be limited in scope by the specific embodiments described herein. For example, although many of the embodiments disclosed herein have been described with reference to systems and methods for automated installation of foundation components for axial solar arrays, the principles herein are equally applicable to systems and methods for installing foundations for other structures. Indeed, various modifications of the embodiments of the present invention, in addition to those described herein, will be apparent to those of ordinary skill in the art from the foregoing description and accompanying drawings. Thus, such modifications are intended to fall within the scope of the following appended claims. Accordingly, the claims set forth below should be construed in view of the full breath and spirit of the embodiments of the present inventions as disclosed herein.

The invention claimed is:

1. A control system for controlling an automated screw anchor driving operation comprising:
   a controller coupled to a non-volatile memory;
   a plurality of control nodes, controllable by the controller, comprising a first motor coupled to a drive train and a rotary driver connected to the drive train;
   a plurality of sensors communicatively coupled to the controller; and
   a control program stored in non-volatile memory, executable by the controller to control the plurality of control nodes to automatically drive a screw anchor into underlying ground to a predetermined embedment depth based at least in part on information received by the controller from at least one of the plurality of sensors while driving the screw anchor, wherein the plurality of control nodes further comprises a tool driver movable with the drive train and operable to control a tool through the rotary driver and screw anchor while the rotary driver drives the screw anchor into underlying ground.

2. The system of claim 1, wherein the plurality of control nodes further comprises a second motor operable to move the tool and tool driver along the mast independent of the drive train.

3. The system of claim 1, wherein the tool is a drill shaft connected to a drill bit and, based on information received from at least one of the plurality of sensors while driving the screw anchor, the control program causes the controller to change a diameter of the drill bit.

4. The system of claim 1, wherein the control program causes the controller to control the first motor to move the drive train at a first rate and to control the rotary driver to rotate the screw anchor so that it will advance at substantially the same rate.

5. The system of claim 1, wherein based on information received from at least one of the plurality of sensors while driving the screw anchor, the control program causes the controller to control the first motor to output a constant output power to the drive train to control the rotary driver to advance the screw anchor at a rate that substantially matches the drive train resulting from the constant output power.

6. The system of claim 1, wherein based on information received from at least one of the plurality of sensors while driving the screw anchor, the control program causes the controller to control the rotary driver to attempt to advance the screw anchor at a rate independent of the first motor and to control a speed of the first motor to move the drive train at a matching rate.

7. The system of claim 1, wherein based on information received from at least one of the plurality of sensors while driving the screw anchor, the control program causes the controller to detect that the screw anchor has reached the predetermined embedment depth and to control the rotary driver and tool driver to terminate the driving operation.

8. The system of claim 1, wherein based on information received from at least one of the plurality of sensors while driving the screw anchor, the control program causes the controller to detect that the screw anchor has encountered a refusal, and in response, to pause the first motor and the rotary driver and to control the second motor to advance the tool ahead of the screw anchor.

9. The system of claim 1, wherein the controller is further programmed to release pressurized air from the tool while driving to remove spoils through the screw anchor.

10. The system of claim 9, wherein based on information received from at least one of the plurality of sensors while driving the screw anchor, control program causes the controller to change a volume per unit of time of pressurized air released from the tool.

11. The system of claim 1, wherein the control program causes the controller to store information received from the plurality of sensors and control instructions given to the control nodes while driving the screw anchor in the non-volatile memory in association with a location of the screw anchor within a coordinate system.

12. The system of claim 1, wherein the sensors are selected from the group consisting of inclinometers, linear encoders, rotary encoders, pressure sensors, temperature sensors and load cells.

* * * * *